United States Patent Office 3,487,074
Patented Dec. 30, 1969

3,487,074
DERIVATIVES OF 6-AMINO-3-PENAMYLCARBOX-YLIC ACID AND 7-AMINO-2,2-DIMETHYL-CEPH-ALOSPORANIC ACID
John Clark Sheehan, Lexington, Mass., assignor to Bristol-Myers Company, New York, N.Y., a corporation of Delaware
No Drawing. Filed Jan. 14, 1966, Ser. No. 520,633
Int. Cl. C07d 99/16, 99/24; A61k 21/00
U.S. Cl. 260—239.1                                    23 Claims

ABSTRACT OF THE DISCLOSURE

Compounds are disclosed which have utility as antibacterial agents. These compounds are derivatives of 6-amino-3-penamyl carboxylic acid and 7-amino-2,2-dimethyl cephalosporanic acid.

---

This invention relates to two new classes of synthetic chemicals of value as antibacterial agents, as nutritional supplements in animal feeds, as agents for the treatment of mastitis in cattle and a therapeutic agents in poultry and animals, including man, in the treatment of infectious diseases caused by Gram-positive and Gram-negative bacteria and, more particularly, relates to the classes of mono-N-acyl derivatives of the two amino acids having the formulae

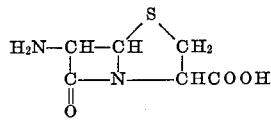

and

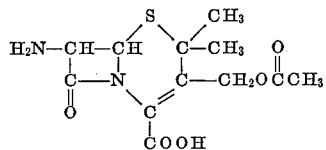

including the salts of said derivatives.

A large number of chemicals have been used in one manner or another as antibacterial agents beginning with compounds as simple as phenol. The very number which have been used is testimony to the need for alternate agents to provide varying pharmacological, pharmaceutical and bacteriological properties. It was the objective of the present invention to provide additional classes of antibacterial agents.

The objectives of the present invention have been achieved by the provision, according to the present invention, of the compounds of the formula

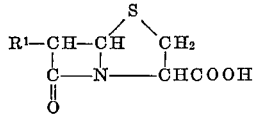

wherein $R^1$ represents acylamino; and nontoxic, pharmaceutically acceptable salts thereof, and the compounds of the formula

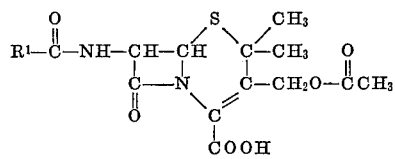

wherein $R^1$ represents acylamino; and nontoxic, pharmaceutically acceptable salts thereof.

Preferred embodiments of the present invention are the compounds of the formulae

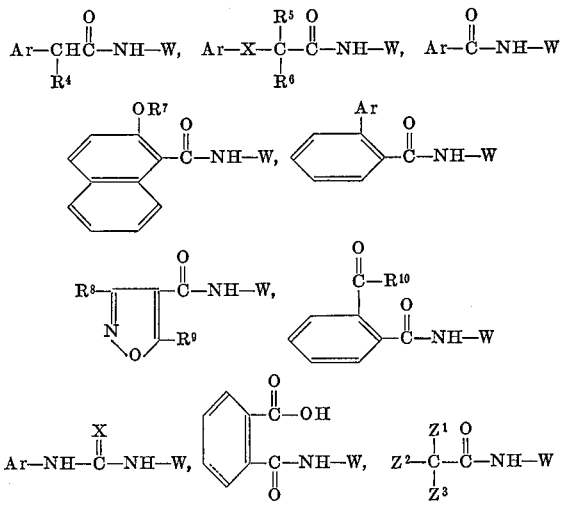

and

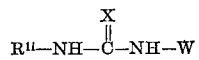

wherein $R^4$ represents a member selected from the group consisting of hydrogen, amino, carbobenzoxyamino, phenyl, fluoro, chloro, bromo, iodo, hydroxyl, (lower) alkanoyloxy and (lower)alkoxy; X represents a member selected from the group consisting of oxygen and sulfur; $R^5$ and $R^6$ each represent a member selected from the group consisting of hydrogen, phenyl, benzyl, phenethyl and (lower)alkyl; $R^7$ represents (lower)alkyl; $R^8$ and $R^9$ each represent a member selected from the group consisting of (lower)alkyl, (lower)alkylthio, benzylthio, cyclohexyl, cyclopentyl, cycloheptyl, benzyl, phenethyl phenylpropyl, furyl, thienyl, naphthyl and Ar—; $R^{10}$ represents a member selected from the group consisting of (lower)alkylamino, di(lower)alkylamino, cycloalkylamino having from 3 to 7 carbon atoms inclusive, allylamino, diallylamino, phenyl(lower)alkylamino, morpholino, lower(alkyl)morpholino, di(lower)alkylmorpholino, morpholino(lower)alkylamino, pyrrolidino, (lower)alkylpyrrolidino, di(lower)alkylpyrrolidino, N,N-hexamethyleneimino, piperidino, (lower)alkylpiperidino, di(lower)alkylpiperidino, 1,2,5,6-tetrahydropyridino, N-(lower)alkylpiperazino, N-phenylpiperazino, N-(lower) alkyl(lower)alkylpiperazino, N - (lower)alkyl-di-(lower) alkylpiperazino, furfurylamino, tetrahydrofurfurylamino, N-(lower)alkyl - N - furfurylamino, N-alkyl - N-anilino and (lower)alkoxyanilino; $Z^1$, $Z^2$ and $Z^3$ each represent a member selected from the group consisting of (lower)alkyl and Ar—; $R^{11}$ represents a member selected from the group consistin gof (lower)alkyl, (lower)cycloalkyl, naphthyl, benzyl, phenethyl and

and Ar— represents a monovalent radical having one of the formulae

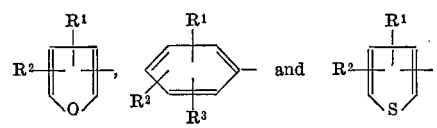

wherein $R^1$, $R^2$ and $R^3$ are each a member selected from the group consisting of hydrogen, chloro, bromo, iodo, trifluoromethyl, phenyl, (lower)alkyl and (lower)alkoxy, but only one R group may represent phenyl, and W represents one of the two groups having the formulae

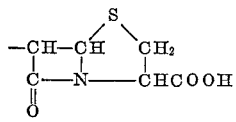

and

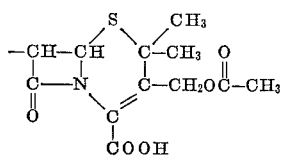

and nontoxic pharmaceutically acceptable salts thereof.

Included within the present invention and illustrative thereof are the nontoxic, pharmaceutically acceptable salts and free acid forms of the acids having the following formulae:

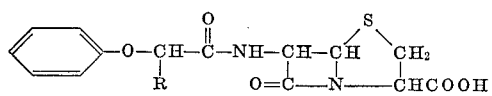

wherein R represents (lower)alkyl;

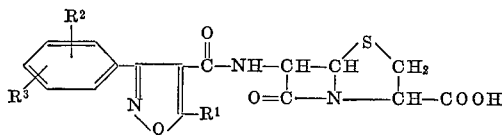

wherein $R^1$ represents (lower)alkyl and $R^2$ and $R^3$ each represent a member selected from the group consisting of hydrogen and chloro;

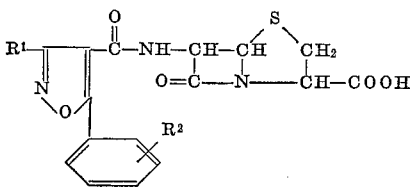

wherein $R^1$ is (lower)alkyl and $R^2$ is a member selected from the group consisting of hydrogen and chloro;

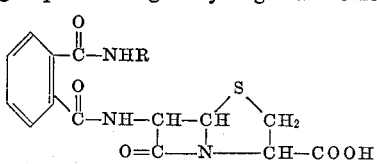

wherein R represents (lower)alkyl;

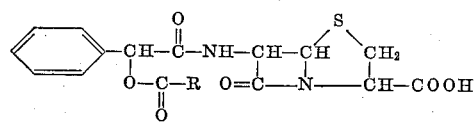

wherein R is (lower)alkyl;

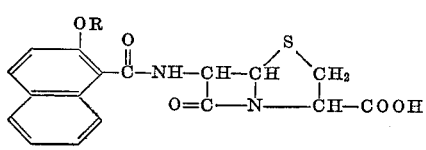

wherein R is (lower)alkyl;

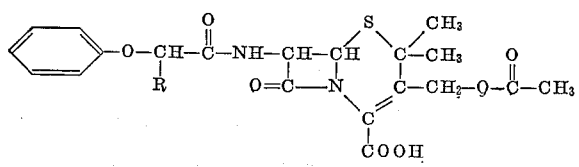

wherein R represents (lower)alkyl;

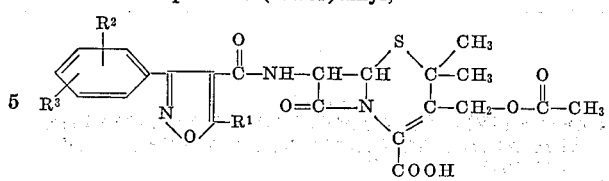

wherein $R^1$ represents (lower)alkyl and $R^2$ and $R^3$ each represent a member selected from the group consisting of hydrogen and chloro;

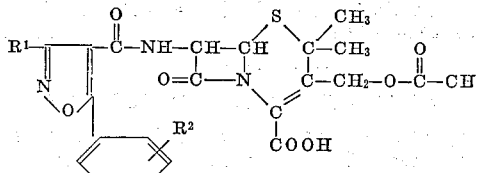

wherein $R^1$ is (lower)alkyl and $R^2$ is a member selected from the group consisting of hydrogen and chloro·

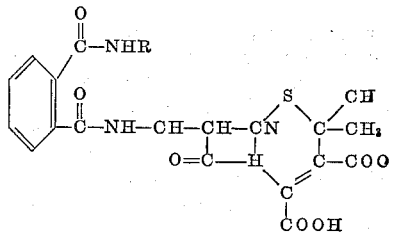

wherein R represents (lower)alkyl;

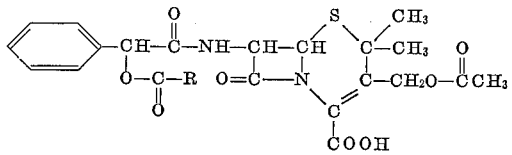

wherein R is (lower)alkyl;

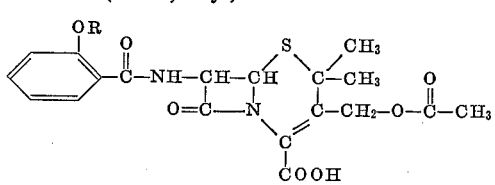

wherein R is (lower)alkyl.

The present invention provides the process for the production of an antibacterial agent which comprises reacting a compound of the formula

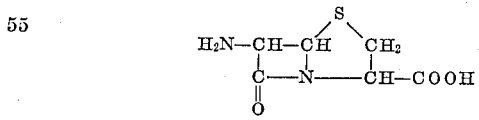

or a salt thereof with an organic monocarboxylic acid chloride or a functional equivalent thereof, and also the process for the production of an antibacterial agent which comprises reacting a compound of the formula

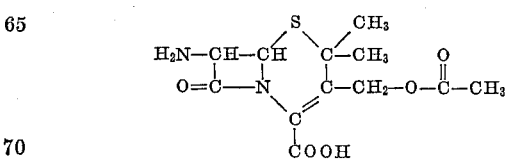

or a salt thereof with an organic monocarboxylic acid chloride or a functional equivalent thereof.

In a preferred embodiment the present invention provides the process for the production of an antibacterial agent which comprises reacting a compound of the formulae

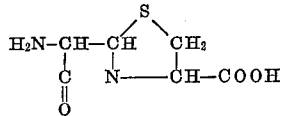

or

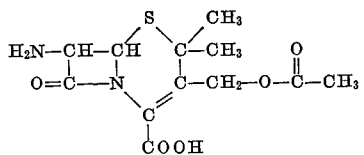

or a salt thereof either with an organic monocarboxylic acid chloride of the formula

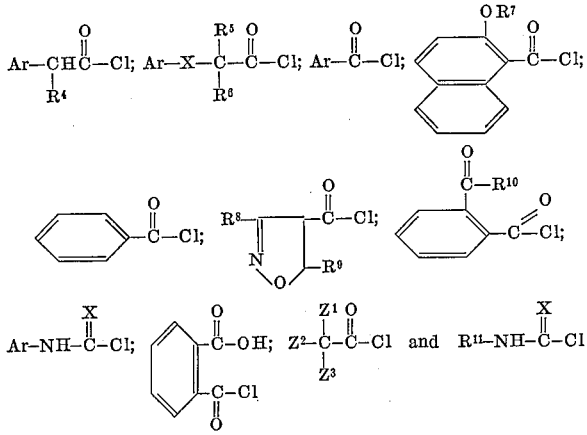

wherein $R^4$ represents a member selected from the group consisting of hydrogen, amino, carbobenzoxyamino, phenyl, fluoro, chloro, bromo, iodo, hydroxy, (lower) alkanoyloxy and (lower) alkoxy; X represents a member selected from the group consisting of oxygen and sulfur; $R^5$ and $R^6$ each represent a member selected from the group consisting of hydrogen, phenyl, benzyl, phenethyl and (lower)alkyl; $R^7$ represents (lower) alkyl; $R^8$ and $R^9$ each represent a member selected from the group consisting of (lower)alkyl, (lower)alkylthio, benzylthio, cyclohexyl, cyclopentyl, cycloheptyl, benzyl, phenethyl, phenylpropyl, furyl, thienyl, naphthyl and Ar—; $R^{10}$ represents a member selected from the group consisting of (lower)alkylamino, di(lower)alkylamino, cycloalkylamino having from 3 to 7 carbon atoms inclusive, allylamino, diallylamino, phenyl(lower)alkylamino, morpholino, (lower)alkylmorpholino, di(lower)alkylmorpholino, morpholino(lower)alkylamino, pyrrolidino, (lower)alkylpyrrlidino, di(lower)alkylpyrrolidino, N,N-hexamethyleneimino, piperidino, (lower)alkylpiperidino, di(lower)alkylpiperidino, 1,2,5,6-tetrahydropyridino, N - (lower)alkylpiperazino, N - phenylpiperazino, N - (lower)alkyl (lower)alkylpiperazino, N-(lower)alkyl - di-(lower)alkylpiperazino, furfurylamino, tetrahydrofurfurylamino, N-(lower)alkyl-N-furfurylamino, N - alkyl - N - anilino and (lower) alkoxyanilino; $Z^1$, $Z^2$ and $Z^3$ each represent a member selected from the group consisting of (lower) alkyl and Ar—; $R^{11}$ represents a member selected from the group consisting of (lower)alkyl, (lower)cycloalkyl, naphthyl, benzyl, phenethyl and

and Ar— represents a monovalent radical having one of the formulae

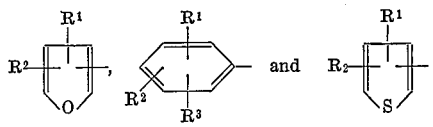

wherein $R^1$, $R^2$ and $R^3$ are each a member selected from the group consisting of hydrogen, chloro, bromo, iodo, trifluoromethyl, phenyl, (lower)alkyl and (lower)alkoxy, but only one R group may represent phenyl; or with a functional equivalent of said acid chloride.

The term "(lower)alkyl" as used herein means both straight and branched chain aliphatic hydrocarbon radicals having from one to ten carbon atoms such as methyl, ethyl, propyl, isopropol, butyl, isobutyl, t-butyl, amyl, hexyl, 2-ethylhexyl, heptyl, decyl, etc. Similarly, where the term "(lower)" is used as part of the description of another group, e.g. "(lower)alkoxy," it refers to the alkyl portion of such group which is therefore as described above in connection with "(lower)alkyl."

The functional equivalents of the above acid chlorides as an acylating agent for a primary amino group include the corresponding carboxylic acid bromides, acid anhydrides, including mixed anhydrides and particularly the mixed anhydrides prepared from stronger acids such as the lower aliphatic monoesters of carbonic acid of alkyl and aryl sulfonic acids and of more hindered acids such as diphenylacetic acid. In addition, an acid azide or an active ester or thioester (e.g. with p-nitrophenol, 2,4-dinitrophenol, thiophenol, thioacetic acid) may be used or the free acid itself may be coupled with 6-aminopenicillanic acid after first reacting said free acid with N,N'-dimethylchloroformiminium chloride [cf. Great Britain 1,-008,170 and Novak and Weichet, Experientia XXI/6, 360 (1965)] or by the use of enzymes or of an N,N'-carbonyldiimidazole or an N,N'-carbonylditriazole [cf. South African patent specification 63/2684], of a carbodiimide reagent [especially N,N'-dicyclohexylcarbodiimide, N,N'-diisopropylcarbodiimide or N-cyclohexyl-N'-(2-morpholinoethyl)carbodiimide; cf. Sheehan and Hess, J. Amer. Chem. Soc. 77, 1067, (1955)], or of alkynylamine reagent [cf. R. Buijle and H. G. Viehe, Angew. Chem. International Edition 3, 582 (1964)], or of a ketenimine reagent [cf. C. L. Stevens and M. E. Monk, J. Amer. Chem. Soc. 80, 4065 (1958)] or of an isoxazolium salt reagent [cf. R. B. Woodward, R. A. Olofson and H. Mayer, J. Amer. Chem. Soc. 83, 1010 (1961)]. Another equivalent of the acid chloride is a corresponding azolide, i.e. an amide of the corresponding acid whose amide nitrogen is a member of a quasi-aromatic five-membered ring containing at least two nitrogen atoms, i.e. imidazole, pyrazole, the triazoles, benzimidazole, benzotriazole and their substituted derivatives. As an example of the general method for the preparation of an azolide, N,N'-carbonyldiimidazole is reacted with a carboxylic acid in equimolar proportions at room temperature in tetrahydrofuran, chloroform, dimethylformamide or a similar inert solvent to form the carboxylic acid imidazolide in practically quantitative yield with liberation of carbon dioxide and one mole of imidazole. Dicarboxylic acids yield diimidazolides. The by-product, imidazole, precipitates and may be separated and the imidazolide isolated but this is not essential. The methods for carrying out these reactions to produce a penicillin and the methods used to isolate the penicillins so-produced are well-known in the art.

The nontoxic, pharmaceutically acceptable salts include metallic salts such as sodium, potassium, calcium and aluminum, the ammonium salt and substituted ammonium salts, e.g. salts of such nontoxic amines as trialkylamines, including triethylamine, procaine, dibenzylamine, N-benzyl-beta-phenethylamine, 1-ephenamine, N, N'-dibenzylethylenediamine, dehydroabietylamine, N,N'-bis-dehydroabietylethylenediamine, N-(lower)alkylpiperidines, e.g. N-ethylpiperidine, and other amines which have been used to form salts with benzylpenicillin.

There are particularly included within the scope of the present invention the antibacterial agents which are prepared in the above-described acylation process by the use therein of the organic monocarboxylic acids or their acid chlorides or other equivalents which have previously been used to acylate 6-aminopenicillanic acid as described, for example, in U.S. Patents 2,941,995; 2,951,839; 2,985,648; 2,996,501; 3,007,920; 3,025,290; 3,028,379; 3,035,047; 3,040,032; 3,040,033; 3,041,332; 3,041,333; 3,043,831; 3,053,831; 3,071,575; 3,071,576; 3,079,305; 3,079,306; 3,080,356; 3,082,204; 3,093,547; 3,093,633; 3,116,285; 3,117,119; 3,118,877; 3,120,512; 3,120,513; 3,120,514; 3,127,394; 3,140,282; 3,142,673; 3,147,247; 3,174,964; 3,180,863; 3,198,804; 3,202,653; 3,202,654; 3,202,655; 3,210,337; 3,157,639; 3,134,767; 3,132,136; in British patent specifications 874,414; 874,416; 876,516; 876,662; 877,120; 877,323; 877,531; 878,233; 880,042; 880,400; 882,335; 888,110; 888,552; 889,066; 889,069; 889,070; 889,168; 889,231; 890,201; 891,174; 891,279; 891,586; 891,777; 891,938; 893,518; 894,247; 894,457; 894,460; 896,072; 899,199; 900,666; 902,703; 903,785; 904,576; 905,778; 906,383; 908,787; 914,419; 916,097; 916,204; 916,205; 916,488; 918,169; 920,176; 920,177; 920,300; 921,513; 922,278; 924,037; 925,281; 931,567; 932,644; 938,066; 938,321; 939,708; 940,488; 943,608; 944,417; in numerous Belgian Patents, e.g. 593,222; 595,171; 597,-859; 602,494; 603,703; 609,039; 616,419; 617,187; and in South African patent applications, e.g. 60/2882; 60/3057; 60/3748; 61/1649; R61/2751; 62/54; 62/4920; 63/1612 and 63/2423.

When the acylamino group of the compounds of the present invention also contains a strongly basic group, e.g. primary amino, as in the case of the preferred embodiments having the formulae

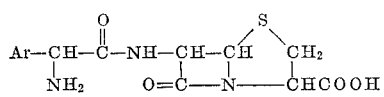

and

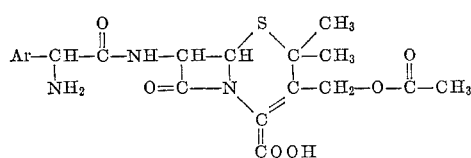

wherein Ar is as defined above (and R¹, R² and R³ in Ar are preferably hydrogen), the products are amphoteric and normally exist in the zwiterrion form but can form acid addition salts, as with such nontoxic, pharmaceutically acceptable organic acids as acetic, citric, succinic, ascorbic and the like and with inorganic acids such as hydrochloric, hydrobromic, sulfuric, phosphoric and the like.

The processes of the present invention also require the use as "final reagents" of the compound of the formula

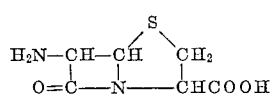

and its salts with acids and bases and the compound of the formula

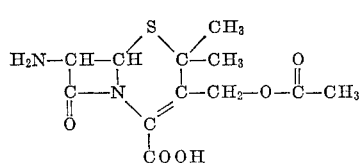

and its salts with acids and bases.

As illustrated below, these "final reagents" are prepared, for example, by subjecting to hydrogenolysis the compound of the formula

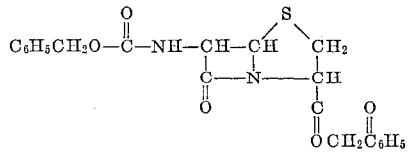

or by subjecting to hydrogenolysis the compound of the formula

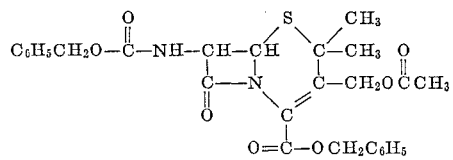

or by subjecting to acid cleavage either the compound of the formula

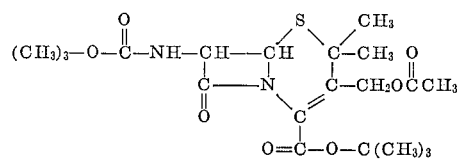

the compound of the formula

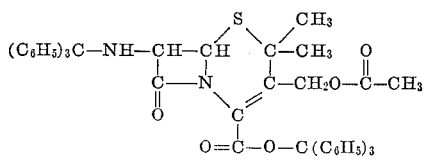

Said esters are in turn prepared in general as exemplified below by the reaction with appropriate esters of compounds of the formulae

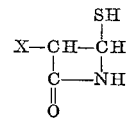

and

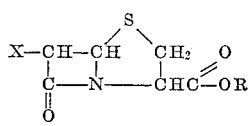

wherein X represents a "blocked" primary amino group as the term is used in the field of peptide synthesis, e.g. phthalimido, tritylamino, o-nitrophenoxyacetamido and its equivalents as described later in this specification, o-nitrophenylsulfenylamino, carbobenzyloxyamino, formylamino, carbo-t-butyloxyamino. There are thus produced compounds of the formulae

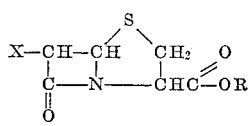

and

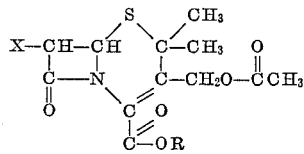

in which X is the same and R represents a labile ester group capable of being easily removed, as by hydrogenolysis or acid cleavage.

These esters are then converted to "final reagents" by removal of the R group and conversion of the X group to a free amino group, either consecutively or simultaneously. Thus when the blocked amino group X represents phthalimido, it is converted to primary amino by treatment with hydrazine hydrate in dioxane at about room temperature for at least twelve hours. When X represents carbobenzyloxyamino the blocked amino group is converted to a primary amino group by catalytic hydrogenation to leave the product, 3-amino-4-mercapto-2-azetidinone. When the blocked amino group is formyl, carbo-t-butyloxy-amino or o-nitrophenylsulfenylamino it is converted to primary amino either by reaction with anhydrous hydrogen chloride in a non-protonating solvent such as benzene or methylene chloride or by reaction with trifluoroacetic acid. The tritylamino compound can also be converted to the free amino compound by treatment of a solution in acetone with p-toluenesulfonic acid monohydrate to give the free primary amine in the form of its p-toluenesulfonate salt; see B. K. Koe, Nature 195, 1200 (1963). In addition, when the blocked amino group is tritylamino or carbo-t-butyloxyamino, the final two reactions are conducted in one step by the use of stronger acid for longer periods of time and, if desired, at higher temperatures.

When the blocked amino group X is o-nitrophenoxyacetamido, it is converted into a primary amino group to produce 3-amino-4-mercapto-2-azetidinone by either (a) catalytic hydrogenation (e.g. in water at room temperature using 30% Pd-on-diatomaceous earth) followed by allowing the mixture to stand at an acidic pH (e.g. in water acidified to pH 2 with 20% hydrocrloric acid at about 10° C. for at least 20 minutes or at 25° C. for at least 24 hours) or (b) by adding the blocked compound (e.g. 7 millimoles) in cold water, e.g. 30 ml., rapidly, e.g. over 1-3 minutes, to 5% Pd-C, (e.g. 0.05 g.) suspended in a cold solution of KBH₄, (e.g. 14 millimoles) dissolved in water, e.g. 70 ml.

The compounds of the formulae

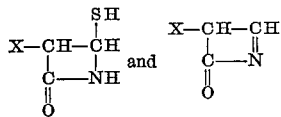

are also unknown; detailed and alternative methods for their preparation are given at the end of this specification under the heading "Preparation of Starting Materials." In particular, methods disclosed therein for conversion of X to a free amino group are also applicable when required for the preparation of the compounds of the present invention.

The following examples will illustrate the present invention without limiting it thereto.

EXAMPLE 1

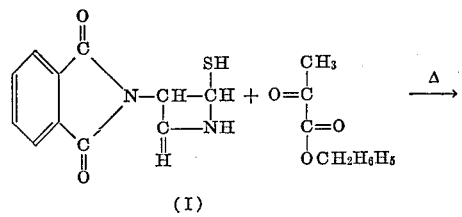

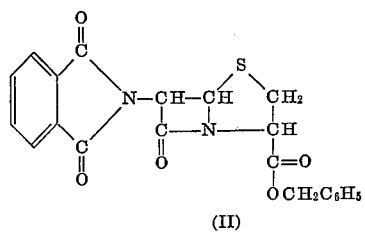

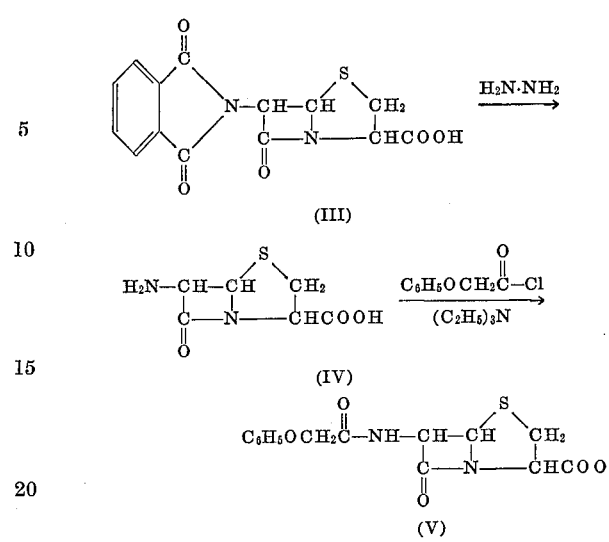

A mixture of 1 g. of 3-phthalimido-4-mercapto-2-azetidinone (I) and one equivalent of benzyl pyruvate in 50 ml. toluene is refluxed for three hours, cooled and concentrated under reduced pressure to leave as the residue, crude benzyl 6-phthalimido-3-penamylcarboxylate (II), which is named according to Sheehan et al., J. Amer. Cem. Soc. 75, 3292–3 (1953).

The residue (II) is converted to the free acid by hydrogenolysis using a Pd catalyst and 20 ml. ethyl acetate as the solvent and 50 p.s.i.g. hydrogen at room temperature. After removal of the catalyst by filtration the solvent is removed by distillation in vacuo to leave as the residue 6-phthalimido-3-penamylcarboxylic acid (III).

The residue (III) is mixed with one equivalent of hydrazine hydrate in 20 ml. dioxane and allowed to stand for 12 hours at room temperature. Acidification with hydrogen chloride then precipitates phthalhydrazide which is removed by filtration to give as the filtrate a solution of 6-amino-3-penamylcarboxylic acid (IV) which is used directly in the next reaction or, if desired, is isolated as a crystalline, amphoteric solid which is easily recrystallized by solution in a minimum volume of water followed by the addition of concentrated hydrochloric acid to lower the pH to the isoelectric point.

To the solution of 6-amino-3-penamylcarboxylic acid there are added three equivalents of phenoxyacetyl chloride and three equivalents of triethylamine to produce 6-phenoxyacetamido-3-penamylcarboxylic acid (IV), which is preferably isolated as its crystalline potassium salt by extracting the acid from an acidic, aqueous solution (e.g. pH 2) into diethyl ether, drying the ether and adding at least one equivalent of a solution of potassium 2-ethylhexanoate (e.g. 0.373 gm./ml.) in dry n-butanol. The potassium salt forms, precipitates, usually in crystalline form, is collected by filtration and found to be a potent antibacterial agent versus both Gram-positive and Gram-negative bacteria, being bactericidal at concentrations of less than 1000 p.p.m.

EXAMPLE 2

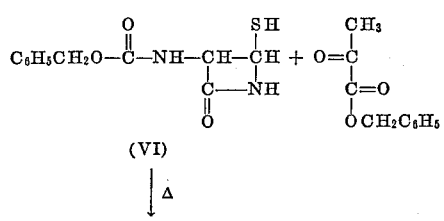

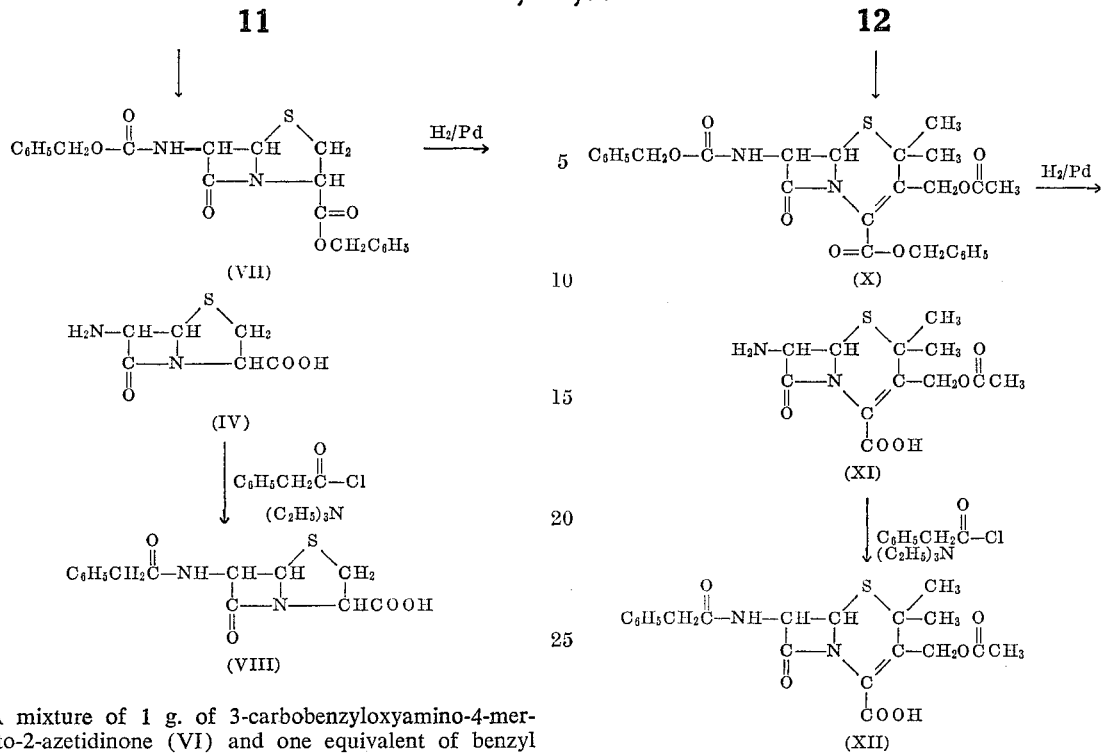

A mixture of 1 g. of 3-carbobenzyloxyamino-4-mercapto-2-azetidinone (VI) and one equivalent of benzyl pyruvate in 50 ml. toluene is refluxed for three hours, cooled and concentrated under reduced pressure to leave as the residue benzyl 6-carbobenzyloxyamino-3-penamylcarboxylate (VII).

The residue (VII) is subjected to hydrogenolysis using a Pd catalyst and 20 ml. ethyl acetate as the solvent and 50 p.s.i.g. hydrogen at room temperature. After removal of the catalyst by filtration the solvent is removed by distillation in vacuo to leave as the residue 6-amino-3-penamylcarboxylic acid (IV) which is used directly in the next reaction or, if desired, is isolated as a crystalline amphoteric solid.

A solution of phenylacetyl chloride (6 g.) in dry chloroform is added over ten minutes to a stirred mixture of 6 g. 6-amino-3-penamylcarboxylic acid and 13 ml. triethylamine in 150 ml. dry chloroform. The mixture is stirred for two hours, filtered and shaken with N hydrochloric acid to give an aqueous phase of pH 2, retaining only the chloroform layer which is washed with water, filtered and shaken with dilute aqueous sodium hydroxide to transfer the product to the aqueous phase, which is separated and then quickly layered with diethyl ether and adjusted to pH 2 with hydrochloric acid. After two extractions with ether, the ethereal phase containing the 6-phenylacetamido-3-penamylcarboxylic acid (VIII) is dried and to it there is added at least one equivalent of a solution of potassium 2-ethylhexanoate (e.g. 0.373 g./l.) in dry n-butanol. The potassium salt forms, precipitates, is collected by filtration and is found to be a potent antibacterial agent versus both Gram-negative and Gram-positive bacteria, being bactericidal at concentrations of less than 800 p.p.m.

EXAMPLE 3

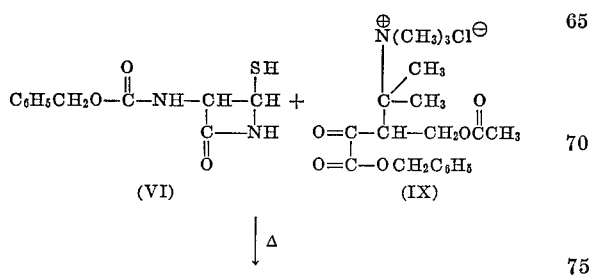

Using the procedures of Example 2, equimolar weights of compounds VI and IX are refluxed in toluene to produce compound X which is converted by hydrogenolysis to compound XI. Acylation of compound XI produces the potent antibacterial agent having structure XII.

EXAMPLE 4

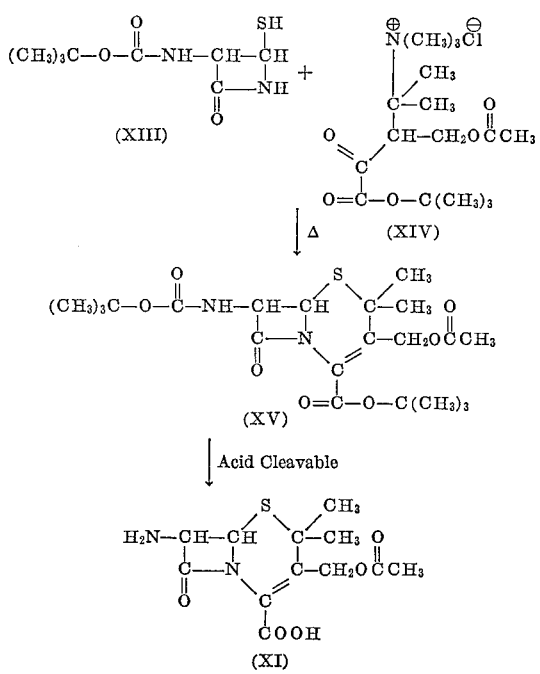

Using the procedures of Examples 2 and 3, reaction of equimolar weights of compounds (XIII) and (XIV) produces compound (XV) which is converted to compound (XI) by acid, e.g. by reaction with anhydrous hydrogen chloride in a non-protonating solvent such as benzene or methylene chloride or by reaction with trifluoroacetic acid.

EXAMPLE 5

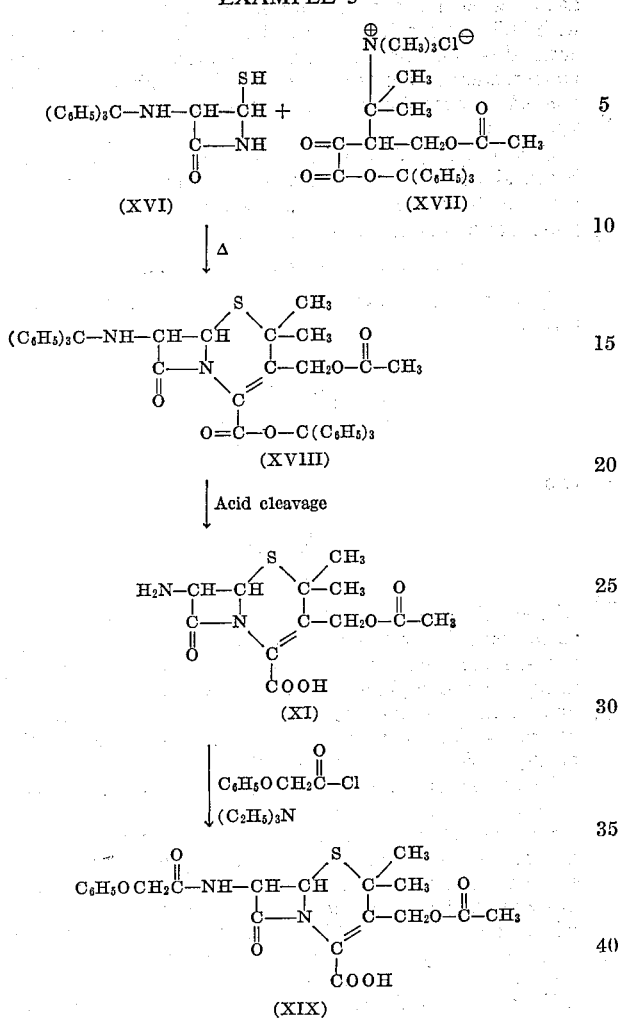

Using the procedures of Examples 2, 3 and 4, reaction of equimolar weights of compounds (XVI) and (XVII) produces compound (XVIII), which is converted to compound (XI) by acid cleavage, e.g. by reaction with anhydrous hydrogen chloride in a non-protonating solvent such as benzene or methylene chloride or by reaction with trifluoroacetic acid. Compound (XI) as its triethylamine salt is converted to antibacterial agent (XIX) by reaction with phenoxyacetyl chloride.

EXAMPLE 6

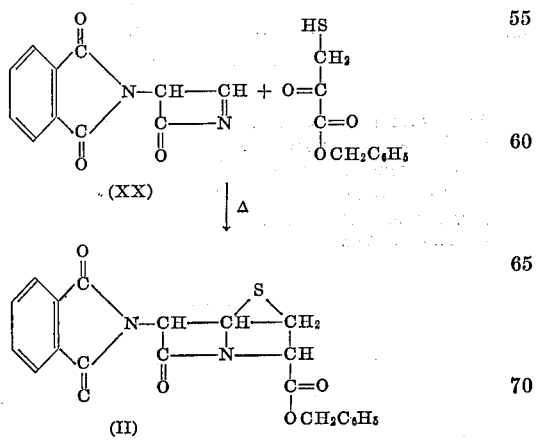

A mixture of one gram of 3-phthalimido-$\Delta^{1,4}$-2-azetidinone (XX) and one equivalent of benzyl $\beta$-mercaptopyruvate is warmed in benzene until reaction is complete, cooled and concentrated under reduced pressure to leave as the residue crude benzyl 6-phthalimido-3-penamylcarboxylate (II) which is processed further by the methods of Example 1.

EXAMPLE 7

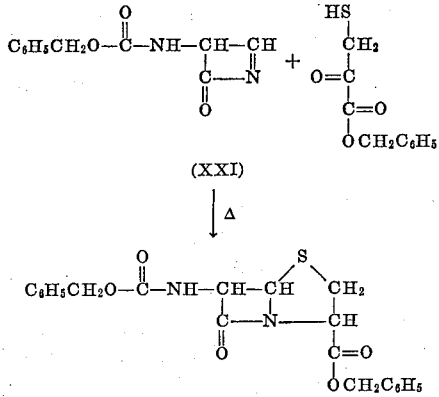

A mixture of one gram of 3-carbobenzyloxyamino-$\Delta^{1,4}$-2-azetidinone (XXI) and one equivalent of benzyl $\beta$-mercaptopyruvate is warmed in benzene until reaction is complete, cooled and concentrated under reduced pressure to leave as the residue crude benzyl 6-carbobenzyl-oxyamino-3-penamyl carboxylate (VII) which is processed further by the methods of Example 2.

EXAMPLE 8

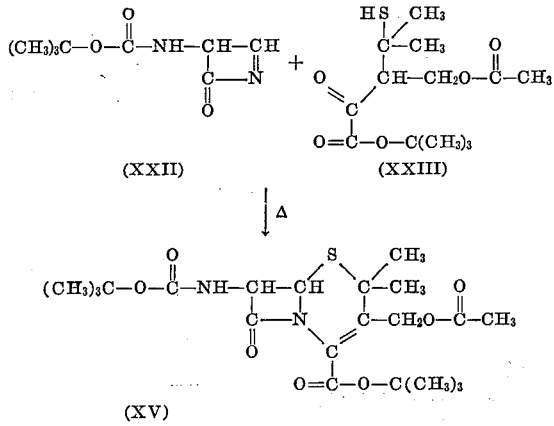

Using the procedure of Example 6, reaction of equimolar weights of compounds (XXII) and (XXIII) produces compound (XV) which is further transformed by the procedure of Example 4.

EXAMPLE 9

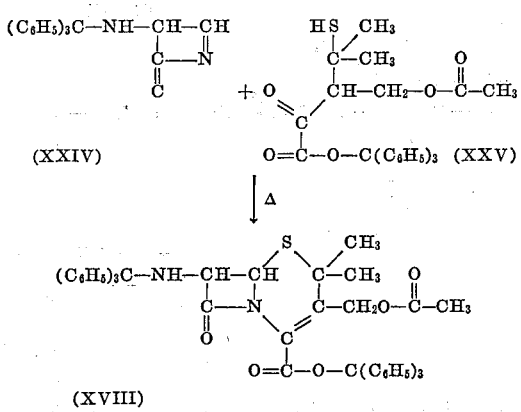

Equimolar weights of compounds (XXIV) and (XXV) are refluxed in benzene to poduce compound (XVIII), which is further modified by subjecting it to the processes of Example 5, i.e. acid cleavage followed by acylation.

EXAMPLE 10

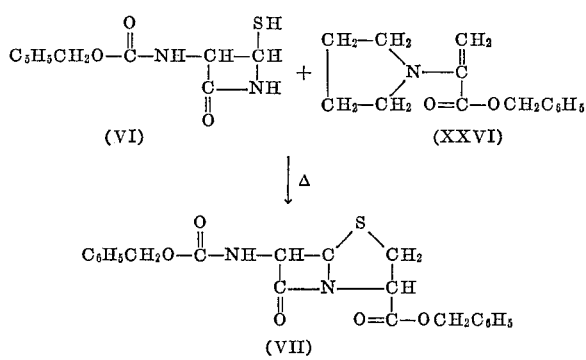

Equimolar weights of compounds (VI) and (XXVI) are warmed in toluene until reaction is complete. Removal of the solvent by distillation in vacuo leaves compound (VII) as the residue. Compound (VII) is then converted to the cyclic amino acid (IV) by the procedure of Example 2.

Use is also made in this procedure in place of compound (XXVI) of the reagents having the following structural formulae:

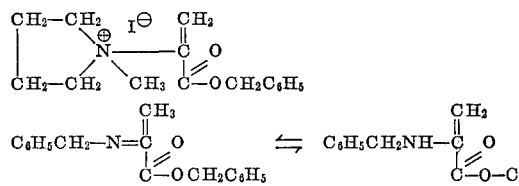

and

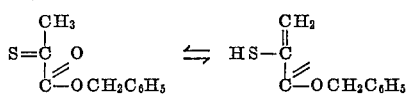

The latter two are shown in their tautomeric forms.

EXAMPLE 11

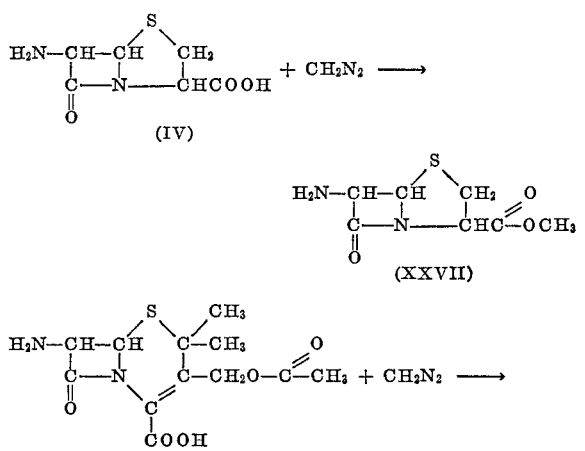

Reaction of compounds (IV) and (XI), respectively, with an equimolar amount of diazomethane in the usual manner for esterification produces the compounds (XXVII) and (XXVIII), respectively, which are each basic amines which are each converted to mothproofing agents when reacted with fluosilicic acid in accordance with U.S. Patents 1,915,334 and 2,075,359 and which are each also converted to amino thiocyanateformaldehyde condensation products of use as pickling inhibitors when reacted in accordance with U.S. Patents 2,425,320 and 2,606,115.

Compounds (IV) and (XI) are themselves active antibacterial agents at concentrations 5 mgm./ml. or less; such solutions are useful, for example, for disinfecting glassware and surgical instruments.

Preparation of starting materials

The starting materials are the compounds of the formulae

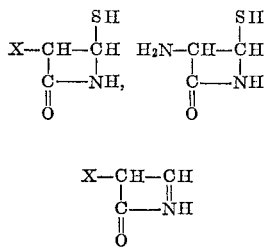

and

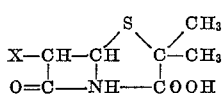

wherein X represents a "blocked" primary amino group as the term is used in the field of peptide synthesis, e.g. phthalimido, tritylamino, o-nitrophenoxyacetamido, o-nitrophenylsulfenylamino, carbobenzyloxyamino, formylamino, carbo-t-butyloxyamino. Of these compounds, the compound having a free primary amino group is sufficiently basic to form acid addition salts.

The acid addition salts can be prepared by conventional methods. For example, 3-amino-4-mercapto-2-azetidinone can be treated with at least a stoichiometric amount of the appropriate acid; and depending upon the nature of the solvent employed, the desired salt will separate spontaneously or can be precipitated by the addition of a solvent in which the salt is insoluble. An acid addition salt can be prepared using acids such as sulfuric, hydrochloric, hydrobromic, nitric, phophoric, benzoic, p-toluenesulfonic, salicylic, acetic, propionic, tartaric, citric, succinic acids and the like. The acid addition salts provide a convenient means for refining the free base and any acid that will form the acid addition salt is suitable. Representative suitable acids include picric, oxalic, and α-naphthoic.

There are a number of processes for the production of these compounds. These processes are presented below in summary form in the customary manner wherein X has the meaning set out above, as follows:

Process No. 1

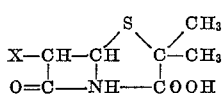

This starting material is prepared from the appropriate 6-"blocked" aminopenicillanic acid according to the procedures reported by Sheehan et al., J. Amer. Chem. Soc. 87, 5468–5469 (Dec. 5, 1965) for the case where X is phthalimido; see also Y. G. Perron et al., J. Med. Soc. 7, 483–487 (1964).

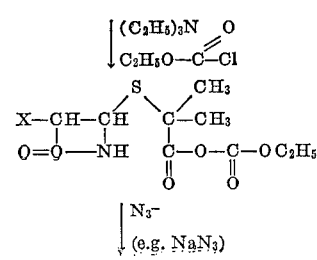

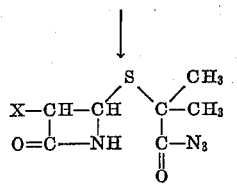

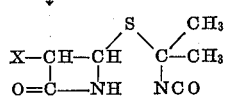

| Curtius Reaction, i.e., —N₂ by heat

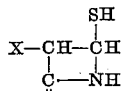

| H₃O⁺, e.g. 90% HCOOH

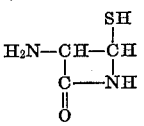

| Cleavage agent $$H_2N-CH-\overset{SH}{\underset{\underset{O}{\|}}{CH}}-C-NH$$

In the final step when the blocked amino group X represents phthalimido, it is converted to primary amino by treatment with hydrazine hydrate in dioxane at about room temperature for at least twelve hours. When X represents carbobenzyloxyamino, the blocked amino group is converted to a primary amino group by catalytic hydrogenation to leave the product, 3-amino-4-mercapto-2-azetidinone. When the blocked amino group is formyl carbo-t-butyloxyamino or o-nitrophenylsulfenylamino it is converted to primary amino either by reaction with anhydrous hydrogen chloride in a non-protonating solvent such as benzene or methylene chloride or by reaction with trifluoroacetic acid. The tritylamino compound can also be converted to the free amino compound by treatment of a solution in acetone with p-toluenesulfonic acid monohydrate to give the free primary amine in the form of its p-toluenesulfonate salt; see B. K. Koe, Nature, 195, 1200 (1963). In addition, when the blocked amino group is tritylamino or carbo-t-butyloxyamino, the final two reactions are conducted in one step by the use of stronger acid for longer periods of time and, if desired, at higher temperatures.

When the block amino group X is o-nitrophenoxyacetamido it is converted to a primary amino group to produce 3-amino-4-mercapto-2-azetidinone by *either* (a) catalytic hydrogenation (e.g. in water at room temperature using 30% Pd-n-diatomaceous earth) followed by allowing the mixture to stand at an acidic pH (e.g. in water acidified to pH 2 with 20% hydrochloric acid at about 10° C. for at least 20 minutes or at 25° C. for at least 24 hours) *or* (b) by adding the blocked compound (e.g. 7 millimoles) in cold water, e.g. 30 ml. rapidly, e.g. over 1–3 minutes, to 5% Pd-C (e.g. 0.05 g.) suspended in a cold solution of KBH₄ (e.g. 14 millimoles) dissolved in water, e.g. 70 ml.

Process No. 2

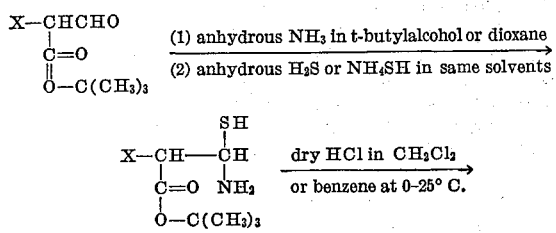

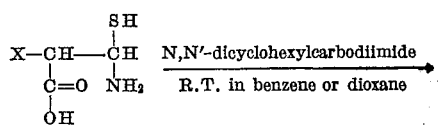

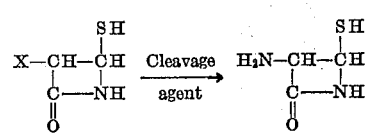

In this process X has the meaning set out above and the final step of converting the blocked amino group to a primary amino group is carried out as described above for the various definitions of group X.

Process No. 3

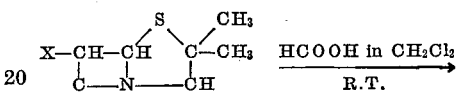

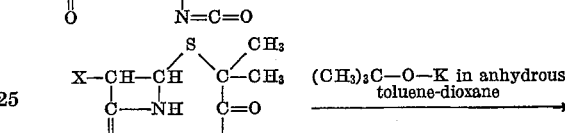

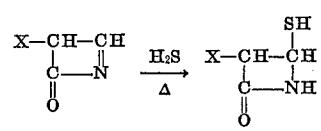

In this process X has the meaning set out above and is preferably phthalimido or carbobenzyloxyamino.

Process No. 4

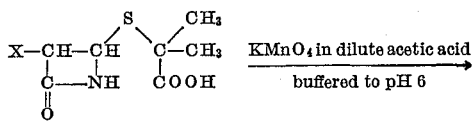

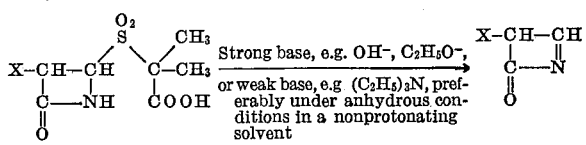

As before, X has the meaning set out above.

Process No. 5

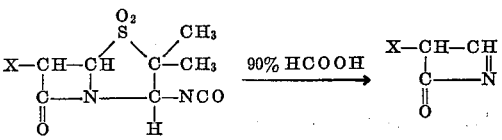

As before, X has the meaning set out above. The starting materials for this one step reaction are prepared by the methods described by Sheehan, et al., J. Amer. Chem. Soc., 87, 5468–5469 (1965) for the compound in which X represents phthalimido with the addition of an oxidation of the sulfur to the sulfone stage by conventional procedures, preferably carried out on the 6-"blocked" aminopenicillanic acid; see U.S. Patent 3,197,466 and Chow et al., J. Org. Chem., 27, 1381-3 (1962) and references therein.

Process No. 6

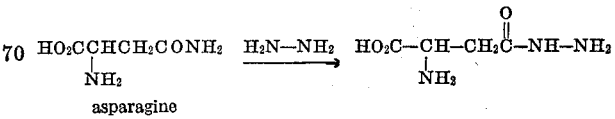

| C₆H₅CHO

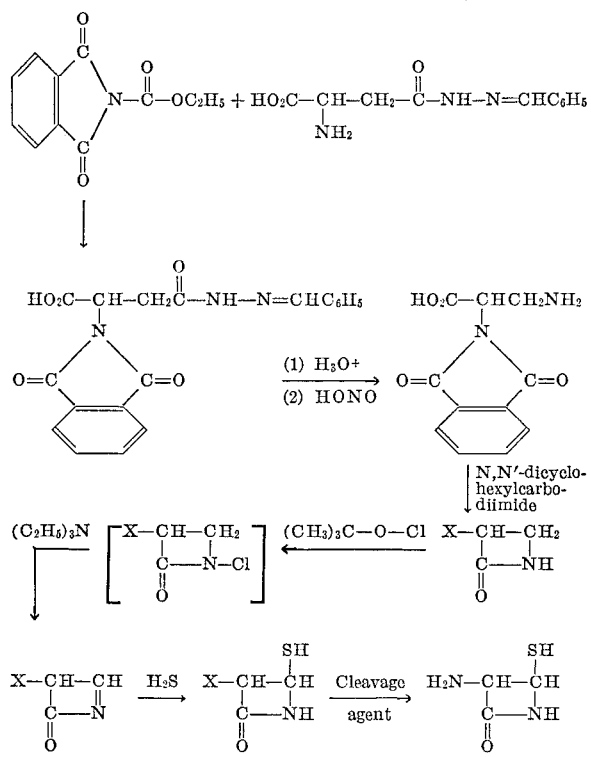

In this process X has the meaning set out above and the final step of converting the blocked amino group to a primary amino group is carried out as described above for the various definitions of group X.

The following examples will illustrate the preparation of these starting materials. All temperatures are given in degrees centigrade. The infrared spectra were measured on a Perkin-Elmer Model 237 recording spectrophotometer. A Varian Associates A–60 instrument was used for recording nuclear magnetic resonance spectra and peak positions are reported in $\tau$ units (TMS=$\tau$10).

EXAMPLE A

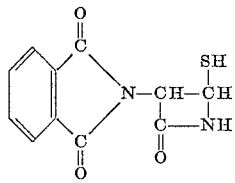

Step A. 3-phthalimido-4-(1'-formyl-1'-methylethylthio)-2-azetidinone

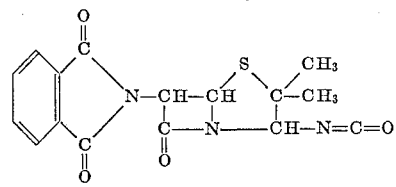

| 90.7% HCOOH in
| CH$_2$Cl$_2$ 3 hours, R.T.

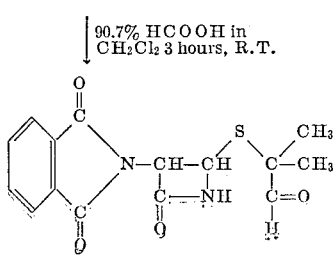

(II)

2,2-dimethyl-6-phthalimido-3-penamyl isocyanate (I) [Y.G. Perron et al., J. Med. Chem., 7, 483 (1964)] (2.0 g.) was dissolved in 150 ml. methylene chloride and added dropwise over about 20 minutes with stirring at room temperature to a solution of 2 g. of 90.7% formic acid in 150 ml. methylene chloride. After stirring was continued at room temperature for a total of 3 hours, the reaction mixture was washed with 30 ml. water and the organic phase was separated, dried over anhydrous MgSO$_4$, filtered and evaporated in vacuo to yield 1.85 g. white crystals. These crystals were slurried in 70 ml. methylene chloride and 0.3 g. insoluble material of M.P. 210° was filtered off.

The remaining, filtered methylene chloride was evaporated in vacuo to give the desired product, 3-phthalimido-4-(1'-formyl-1'-methylethylthio) - 2 - azetidinone as white crystals (plates), 1.5 g., M.P. 118–120°. The infrared spectrum is in full accord with the structure (II) and is identical with the infrared absorption spectrum of the hemisolvate of (II) prepared according to the procedure of Sheehan and Brandt, J. Amer. Chem. Soc., 87, 5468–9 (1965).

IR (II) (CH$_2$Cl$_2$): 3400 (NH), 2810 and 2700 (aldehyde CH), 1790 and 1720 (phthalimido CO), 1720 (aldehyde CO), 1770 ($\beta$-lactam carbonyl) and 1385 cm.$^{-1}$ (gem-dimethyl). Recrystallization from benzene-ligroin yields crystals melting at 112–117 and having identical IR spectra (including the fingerprint area) with II-hemisolvate. Recrystallization from methylene chloride-petroleum ether gives a product melting at 112–114°. Mixed M.P. with II-hemisolvate (M.P. 111–119°) 100–105°.

Analysis of (II)-Calc'd for C$_{15}$H$_{14}$N$_2$O$_4$S: C, 56.59; H, 4.40; S, 10.00. Found: C, 56.17; H, 4.68; S, 9.60.

Chromatography of the crude aldehyde on silica gel column and elution with methylene chloride-acetone afforded white crystals melting at 115–117° and having the IR spectra characteristic of (II).

Step B. 3-phthalimido-4-(1'-carboxy-1'-methylethylthio)-2-azetidinone

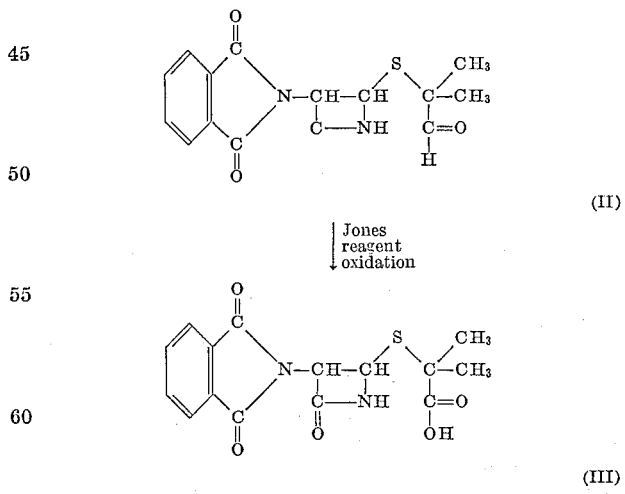

The aldehyde [(II), which was prepared above] was oxidized in acetone with Jones reagent [J. Chem. Soc., 2548 (1953)] according to the procedure used by Sheehan and Brandt, J. Amer. Chem. Soc., 87, 5468–9 (1965).

The infrared absorption spectrum of this product, 3-phthalimido-4-(1' - carboxy - 1' - methylethylthio)-2-azetidinone exhibited all the necessary carboxylic vibrations (somewhat weak broad band at 3400–3300, 1450 and 1250 cm.$^{-1}$ along with the phthaloyl and $\beta$-lactam carbonyl vibrations).

Step C. 3-phthalimido-4-(1'-carbazido-1'-methyl-ethylthio)-2-azetidinone

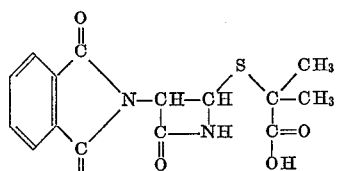

(III)

|  1. ClCOOC₂H₅
|  2. (C₂H₅)₃N
| ↓ 3. NaN₃

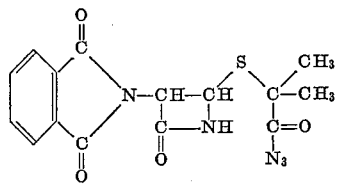

(IV)

The previous acid (III) was submitted to the Bergmann degradation under the usual conditions to produce crystalline azide (IV) which was easily identified by its infrared absorption at 2160 cm.⁻¹.

Thus, to a stirred solution of 3-phthalimido-4-(1'-carboxy-1'methylethylthio)-2-azetidinone (III) (2.20 g., 6.6 mmoles) in 25 ml. of tetrahydrofuran (distilled from posassium hydroxide) was added triethylamine (distilled from potassium hydroxide) (0.67 g., 6.6 mmoles) and the resulting yellow solution was cooled to −15° C. To this stirred solution was added dropwise during one-half hour a solution of ethyl chloroformate (0.72 g., 6.6 mmoles) in 0.4 ml. tetrahydrofuran. A colorless precipitate formed and the resulting mixture was stirred at −10° for one hour. At the end of this time a solution of sodium azide (0.43 g., 6.6 mmoles) in 3.4 ml. of water was added portionwise during 5 minutes, the reaction mixture being stirred at −10° in this addition. The reaction mixture was then diluted with 25 ml. of water while being stirred at 10°. Since no crystallization occurred the yellow solution was extracted into three 100 ml. portions of methylene chloride which were washed with 100 ml. water and then dried over magnesium sulfate, filtered and evaporated under reduced pressure to yield yellowish crystals of 3-phthalimido-4-(1'-carboxy-1'-methylethylthio)-2-azetidinone azide (IV) (1.75 g., 80%), M.P. 100–120°. The infrared spectrum in microns showed bands at 3350 cm.⁻¹ (NH), 3050 cm.⁻¹ (aromatic CH), 2160 cm.⁻¹ (azide band), 1790, 1720 cm.⁻¹ (phthaloyl carbonyls), 1170 cm.⁻¹ (β-lactam carbonyl), 1385 cm.⁻¹ (gem-dimethyl).

Step D. 3-phthalimido-4-(1'-isocyano-1'-methyl-ethylthio)-2-azetidinone

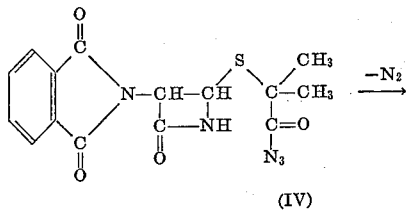

(IV)

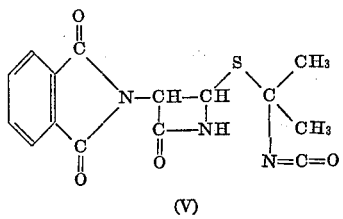

(V)

The previous azide (IV) was kept in a vacuum desiccator overnight to convert it to the isocyanate (V) which was easily identified by its characteristic absorption at 2270 cm.⁻¹ in the infrared. The conversion was also effected by refluxing in methylene chloride or tetrahydrofuran but even a short period of refluxing in benzene or toluene yielded a product devoid of isocyanate absorption in the infrared.

The conversion of the azide (IV) into the isocyanate did not always proceed to completion, as determined by detection of the isocyanate band at 2270 cm.⁻¹ in the IR. Storage under reduced pressure for two weeks or refluxing in methylene chloride each gave a mixture of IV and V.

Step E. 3-phthalimido-4-mercapto-2-azetidinone

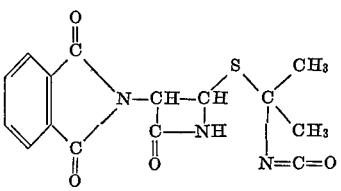

(V)

| 90.7% HCOOH
| in CH₂Cl₂
| ↓ R.T.

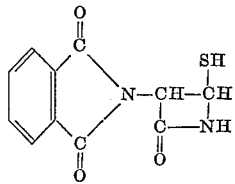

(VI)

A mixture of the azide (IV) and the isocyanate (V) (0.2 g.) was dissolved in 15 ml. of methylene chloride and added dropwise with stirring and under nitrogen (during 15 minutes) to 90.7% formic acid (45 mg., about two equivalents) in 15 ml. of methylene chloride. The reaction mixture was stirred at room temperature under nitrogen for two hours. An IR spectrum of the reaction mixture indicated that both the isocyanate bands (2270 cm.⁻¹) and the azide bands 2160 cm.⁻¹) were substantially affected. Thereafter the reaction was carried on to a total of 4 hours whereupon the IR spectrum of the reaction mixture indicated the complete absence of azide and isocyanate bands.

The reaction mixture was washed with 30 ml. water, the organic layer dried over anhydrous sodium sulfate, filtered and evaporated under reduced pressure to give colorless crystals of 3-phthalimido-4-mercapto-2-azetidinone (VI) (0.14 g., 65% overall yield from the acid), M.P. 130–131°. All these manipulations were performed under nitrogen. Qualitative test for sulfur was positive. The NMR spectrum in deuteryl chloroform showed in τ units: a singlet at 2.2τ (phthaloyl), a broader band at 4.2τ (the β-lactam portons).

IR spectra (CH₂Cl₂): 3350 (NH, weak), 3050 (aromatic CH), 2950 (CH), 2580 (SH, weak), 1790, 1720 (phthaloyl CO), 1770 (β-lactam, medium).

*Analysis.*—Calc'd for $C_{11}H_8N_2O_3S$: C, 53.21; H, 3.20; N, 11.28.28. Found: C, 53.01; H, 4.26; N, 10.99.

EXAMPLE B

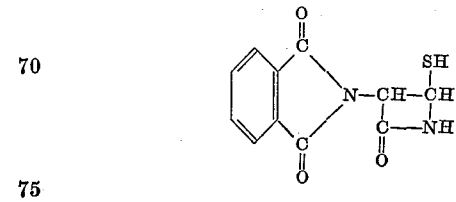

3-phthalimido-4-mercapto-2-azetidinone is prepared by substituting in the procedure of Example A aldehyde (II) prepared either as described by Sheehan and Brandt, J. Amer. Chem. Soc., 87, 5468–9 (1965) or by the method of Example 15, Step A below.

EXAMPLE C

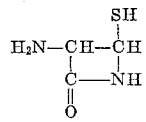

3-amino-4-mercapto-2-azetidinone.—This product is prepared by reacting 3-phthalimido-4-mercapto-2-azetidinone with one equivalent of hydrazine hydrate in dioxane at room temperature for 12 hours and then adding hydrogen chloride to precipitate phthalhydrazide, which is removed by filtration. Lyophilization of the filtrate then provides solid 3-amino-4-mercapto-2-azetidinone hydrochloride.

EXAMPLE D

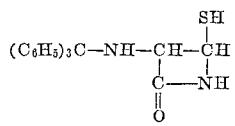

3-tritylamino - 4 - mercapto-2-azetidinone.—This compound is prepared by substituting in the procedure of Example A for the 2,2-dimethyl-6-phthalimido-3-penamyl isocyanate used therein an equal weight of 2,2-dimethyl-6-tritylamino - 3 - penamyl isocyanate prepared by the method of Perron et al., J. Med. Chem., 7, 483–487 (1964) (see also Belgian Patent 655,997 for methods of preparing the intermediate acid azides) from 6-tritylaminopenicillanic acid [see Sheehan et al., J. Amer. Chem. Soc., 84, 2983 (1962)].

Alternatively, the conversion of said isocyanate to aldehyde is carried out using the procedure of Step A in Example 15 below.

EXAMPLE E

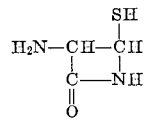

3-amino-4-mercapto-2-azetidinone.—One milligram of 3-tritylamino-4-mercapto-2-azetidinone is dissolved in 20 ml. isopropyl alcohol and 5 ml. of 1 N hydrochloric acid is added. After standing at room temperature for 2 hours the mixture is diluted with 100 ml. water and the triphenyl carbinol is removed by extraction with 400 ml. benzene. The aqueous phase containing the product, 3-amino-4-mercapto-2-azetidinone as its hydrochoride, is lyophilized to yield solid product as the hydrochloride. Treatment of the hydrochloride in solution in water with alkali, e.g. sodium hydroxide, sodium bicarbonate, liberates the free base.

EXAMPLE F

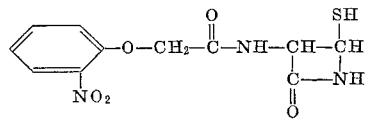

3-o-nitrophenoxyacetamido-4-mercapto-2-azetidinone.—This compound is prepared by substituting in the pro- procedure of Example A beginning with Step C for the 3-phthalimido-4-(1'-carboxy - 1' - methylethylthio)-2-azetidinone used therein an equal weight of 3-o-nitrophenoxyacetamido - 4 - (1' - carboxy-1'-methylethylthio)-2-azetidinone which has previously been prepared by acylation with o-nitrophenoxyacetyl chloride in the presence of excess triethylamine of 3-amino-4-(1'-carboxy-1'-methylethylthio)-2-azetidinone which in turn is prepared by reaction of hydrazine hydrate with 3-phthalimido-4-(1'-carboxy-1'-methylethylthio)-2-azetidinone.

EXAMPLE G

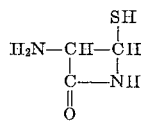

3-amino-4-mercapto-2-azetidinone.—A solution in 10 ml. water of 1.0 g. 3-o-nitrophenoxyacetamido-4-mercapto-2-azetidinone is treated with 1.0 g. prehydrogenated 30% Pd-on-diatomaceous earth and 9 ml. water under 50 p.s.i.g. hydrogen for one hour at room temperature. The solution is then adjusted to pH 2 with 50% hydrochloric acid and allowed to stand for at least twenty minutes at 5–25° C. to produce 3-amino-4-mercapto-2-azetidinone in the form of its hydrochloride.

In a variation of this procedure, the reaction is conducted under anhydrous conditions, i.e. the hydrogenation is in dry benzene and the acid is added as dry hydrogen chloride.

EXAMPLE H

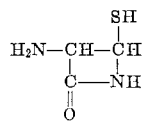

3 - amino-4-mercapto-2-azetidinone.—To 0.75 g. (14 millimoles) of $KBH_4$ dissolved in 70 ml. water there is added 0.05 g. of 5% Pd-C. Nitrogen gas is bubbled through the suspension, which is stirred and cooled to 5° C. The pH is adjusted to between 8.0 and 8.6 by the addition of 6 N HCl and is maintained at that point while a solution of 7 millimoles of 3-o-nitrophenoxyacetamido-4-mercapto-2-azetidinone in 30 ml. water is rapidly added. The mixture is stirred cold for 15 minutes and the pH is lowered to 2.0 by the addition of 6 N HCl. The catalyst is removed by filtration to leave an aqueous solution containing the desired 3-amino-4-mercapto-2-azetidinone hydrochloride.

EXAMPLE I

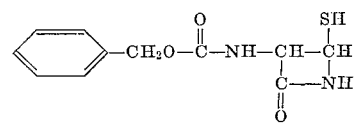

3-carbobenzyloxyamino - 4 - mercapto-2-azetidinone.—This compound is prepared by substituting in the procedure of Example A for the 2,2-dimethyl-6-phthalimido-3-penamyl isocyanate used therein an equal weight of 2,2 - dimethyl-6-carbobenzyloxyamino-3-penamyl isocyanate prepared by the method of Perron et al., J. Med. Chem., 7, 483–487 (1964) (see also Belgian Patent 655,997 for methods of preparing the intermediate acid azides) from 6-carbobenzyloxyaminopenicillanic acid.

Alternatively, the conversion of said isocyanate to aldehyde is carried out using the procedure of Step A in Example O below.

EXAMPLE J

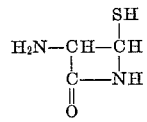

3 - amino - 4 - mercapto - 2 - azetidinone.—This compound is prepared by catalytic hydrogenation of 3-carbobenzyloxy - amino - 4 - mercapto - 2 - azetidinone at room temperature with a platinum catalyst in toluene as a nonprotonating solvent until one mole of hydrogen is absorbed. Filtration to remove the catalyst leaves a solution of 3-amino-4-mercapto-2-azetidinone which is iso-

EXAMPLE K

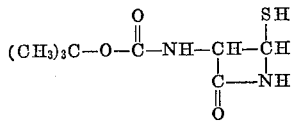

3 - carbo - t - butyloxyamino - 4 - mercapto - 2 - azetidinone.—This compound is prepared by substituting in the procedure of Example A for the 2,2-dimethyl-6-phthalimido-3-penamyl isocyanate used therein an equal weight of 2,2 - dimethyl - 6 - carbo - t - butyloxyamino - 3-penamyl isocyanate prepared by the method of Perron et al., J. Med. Chem., 7, 484–487 (1964) (see also Belgian Patent 655,997 for methods of preparing the intermediate acid azides) from 6-carbo-t-butyloxyaminopenicillanic acid, which is prepared as reported in the literature, or, if desired, by the methods used to prepare 6-ethoxycarbamido-penicillanic acid.

Alternatively, the conversion of said isocyanate to aldehyde is carried out using the procedure of Step A in Example O below.

EXAMPLE L

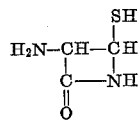

3 - amino - 4 - mercapto - 2 - azetidinone.—This compound is prepared by dissolving 20 milligrams of 3-carbo-t-butyloxyamino-4-mercapto-2-azetidinone in 10 ml. benzene (or methylene chloride) at room temperature and passing in anhydrous hydrogen chloride to provide a solution of 3-amino-4-mercapto-2-azetidinone hydrochloride which is either used immediately or isolated in solid form by lyophilization.

EXAMPLE M

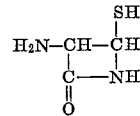

3 - amino - 4 - mercapto - 2 - azetidinone.—This compound is prepared as its trifluoroacetate by dissolving 1.0 g. 3-carbo-t-butyloxyamino-4-mercapto-2-azetidinone in 25 ml. trifluoroacetic acid and allowing the mixture to stand at room temperature for at least 30 minutes or overnight.

EXAMPLE N

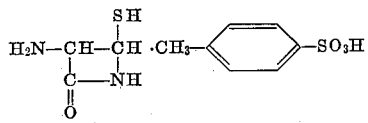

3 - amino - 4 - mercapto - 2 - azetidinone p - toluenesulfonate.—This compound is prepared by stirring a solution of 2-millimoles of 3-tritylamino-4-mercapto-2-azetidinone and 2 millimoles p-toluenesulfonic acid monohydrate in 10 ml. dry acetone for 30 minutes at 25°. The solvent is evaporated under a stream of nitrogen and the residue is triturated with 100 ml. dry diethyl ether, which dissolves the triphenylcarbinol and leaves the 3-amino-4-mercapto-2-azetidinone p-toluenesulfonate as a solid product which is collected by filtration.

EXAMPLE O

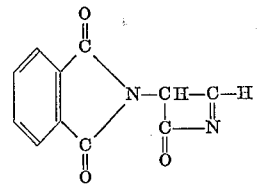

3-phthalimido-$\Delta^{1,4}$-2-azetidinone

Step A. 3 - phthalimido - 4 - (1' - formyl - 1' - methylethylthio)2-azetidinone.—This intermediate was prepared by dropwise addition of 17 g. 2,2-dimethyl-6-phthalimido-3-penamyl isocyanate in 250 ml. methylene chloride to a mixture of 27.2 g. formic acid in 250 ml. methylene chloride over a period of 1.75 hours at room temperature and then stirring the mixture for an additional 1.25 hours. The solution was washed with water (3 x 200 ml.), dried over $MgSO_4$, filtered and evaporated to give an oil which foamed under reduced pressure and solidified. This solid foam was dissolved in methylene chloride, leaving behind some impurities. Evaporation of the methylene chloride left crude, solid 3-phthalimido-4-(1'-formyl-1'-methylethythio)-2-azetidinone which was purified by chromatography. Thus, 5 g. of the crude aldehyde was place in chloroform on a column of 100 mesh silicic acid suspended in benzene. The first eluent used was a mixture of benzene-chloroform (1:1) and fractions of 25 ml. were collected. The column size was 5" x 1¾". Material was obtained from fractions 18–19. This compound was not the required aldehyde; I.R. showed the absence of the NH-stretching frequency and the NMR the lack of the aldehydic proton at $0.7\tau$. Elemental analysis of this compound, M.P. 97°, was C, 57.74; H, 4.79; N, 7.58; S, 7.74.

Continuation of the chromatography gave no further fractions using this particular eluting system. Atfer fraction 23 the eluent was changed to chloroform which upon evaporation gave 3-phthalimido-4-(1'-formyl-1'-methylethylthio)-2-azetidinone as an oil in fractions 27–29. This oil crystallized from benzene M.P. 117–123°, yield 2 g. The IR showed the presence of the NH— absorption band; the spectra was identical to that of a sample of the aldehyde produced by Sheehan and Brandt. The NMR showed two singlets for the gem-dimethyls at $8.6\tau$ and $8.7\tau$. The IMR spectrum was essentially the same as that published in the literature. NMR ($CHCl_3$): $0.7\tau$ (1H, singlet), $2.15\tau$ (4H, multiplet), $2.65\tau$ (3H, singlet benzene of solvation), $4.35\tau$ (1H, doublet) J–5 cps., $5.12\tau$ (1H, doublet) J–5 cps., $8.6\tau$ (3H, singlet), $8.7\tau$ (3H, singlet). Optical rotation of the aldehyde prepared by this method was compared with that prepared by the THF—1H—HCl method. Formic acid method $[\alpha]_{546}$ —61.5° (3.91 in chloroform). THF—HCl method $[\alpha]_{546}$ —64.2° (4.3 in chloroform).

Step B. 3-phthalimido-$\Delta^{1,4}$-2-azetidinone.—This product was prepared from the aldehyde above by direct elimination of the thiol by the use of a strong nucleophile. Thus, to 3-phthalimido-4-(1'-formyl-1'-methylethylthio)-2-azetidinone (0.8 g.) dissolved in an anhydrous mixture of dry toluene and dioxane (1:3, 40 ml.) cooled to 0° C. there was added 0.25 g. potassium t-butoxide. The reaction mixture was stirred vigorously for 45 minutes while maintaining the temperature at 0° C. Removal of the solvent under high vacuum left the product, 3-phthalimido-$\Delta^{1,4}$-2-azetidinone as a yellow solid. This product is insoluble in diethyl ether and soluble in methylene chloride. Washing the product with diethyl either removed residual, unreacted aldehyde, as shown by IR.

The infrared absorption spectrum of 3-phthalimido-$\Delta^{1,4}$-2-azetidinone showed the absence of the —NH absorption maximum and the appearance of the maximum at 1600 cm.$^{-1}$ indicative of the C=N bond. There were also absorption maxima at 1775 and 1715 cm.$^{-1}$ (phthalimido) and at 1765 cm.$^{-1}$ ($\beta$-lactam carbonyl).

The action of water on this compound caused loss of the C=N as shown in the infrared absorption spectrum.

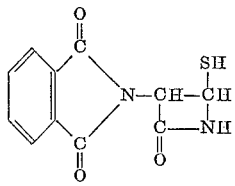

3-phthalimido-4-mercapto-2-azetidinone. — Equimolar mixtures of 3-phthalimido - $\Delta^{1,4}$-2 - azetidinone and anhydrous hydrogen sulfide in benzene, methylene chloride and dioxane, respectively, in pressure vessels when heated for 1, 6, 12, 24 and 48 hours, respectively, at 40°, 60°, 80° and 100°, respectively, produce varying amounts of 3-phthalimido-4-mercapto-2-azetidinone which are used directly for further reaction or isolated in solid form by removal of the solvent by lyophilization.

EXAMPLE Q

Substitution in the procedure of Example O for the 2,2-dimethyl-6-phthalimido-3-penamyl isocyanate used therein of an equal weight of:

2,2-dimethyl-6-tritylamino-3-penamyl isocyanate,
2,2 - dimethyl - 6 - carbobenzyloxyamino - 3 - penamyl isocyanate
2,2-dimethyl-6-o-nitrophenoxyacetamido-3-penamyl isocyanate,
2,2-dimethyl-6-formylamino-3-penamyl isocyanate,
2,2-dimethyl-6-carbo-t-butyloxyamino-3-penamyl isocyanate, and
2,2-dimethyl-6-o-nitrophenylsulfenylamino-3-penamyl isocyanate, respectively, produces:

3-tritylamino-$\Delta^{1,4}$-2-azetidinone,
3-carbobenzyloxyamino-$\Delta^{1,4}$-2-azetidinone,
3-o-nitrophenoxyacetamido-$\Delta^{1,4}$-2-azetidinone,
3-formylamino-$\Delta^{1,4}$-2-azetidinone,
3-carbo-t-butyloxyamino-$\Delta^{1,4}$-2-azetidinone, and
3-o-nitrophenylsulfenylamino-$\Delta^{1,4}$-2-azetidinone, respectively.

Substitution in the procedure of Example 16 for the 3-phthalimido-$\Delta^{1,4}$-2-azetidinone used therein of an equal weight of each of the above products in turn produces:

3-tritylamino-4-mercapto-2-azetidinone,
3-carbobenzyloxyamino-4-mercapto-2-azetidinone,
3-o-nitrophenylsulfenylamino-4-mercapto-2-azetidinone,
3-formylamino-4-mercapto-2-azetidinone,
3-carbo-t-butyloxyamino-4-mercapto-2-azetidinone, and
3-o-nitrophenylsulfenylamino - 4 - mercapto-2-azetidinone, respectively..

EXAMPLE R

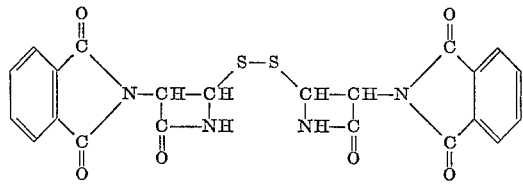

The solid disulfide is produced in moderate amounts as a by-product in the reaction of Step E, Example A and is recovered from the mother liquors remaining after purification of the 3-phthalimido-4-mercapto-2-azetidinone by fractional recrystallization, e.g. from methylene chloride-ether or benzene-petroleum ether and similar systems.

This disulfide is converted to 3-amino-4-mercapto-2-azetidinone by the following methods, of which the first is preferred:

(A) Catalytic hydrogenation.—A solution of 10 mgm. disulfide in 10 ml. benzene is hydrogenated at room temperature using a large excess of palladium or platinum catalyst, i.e. 100 mgm. of palladium black. The catalyst is then removed by filtration and the solvent by evaporation in an inert atmosphere to leave as the residue the desired 3-amino-4-mercapto-2-azetidinone.

(B) Mercaptan interchange.—Solutions of 50 mgm. disulfide in 20 ml. ethyl mercaptan are held for 1, 6, 12, 24 and 48 hours, respectively, at temperatures of 30°, 40°, 50° and 60° respectively, using sealed tubes where necessary, and the reaction mixtures are then distilled in high vacuum to remove the ethyl mercaptan and the diethyl disulfide and leave as the residue varying yields of the desired 3-amino-4-mercapto-2-azetidinone.

(C) Borohydride reduction.—Solutions of disulfide in benzene, methylene chloride methanol, water and dioxane are reduced with sodium borohydride at 0–25° C. to produce 3-amino-4-mercapto-2-azetidinone.

EXAMPLE S

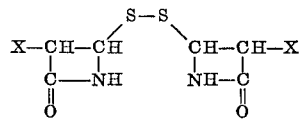

The disulfides of the formula above in which X represents tritylamino, o-nitrophenoxyacetamido, carbobenzyloxyamino and carbo-t-butyloxyamino, respectively, are likewise formed as by-products in the final step of Examples D, F, I and K respectively, and are recovered in the manner described in Example R for the recovery of the disulfide in which the blocking group X is phthalimido.

Following the procedures for splitting disulfides set forth in Example R, these disulfides are converted to:

3-tritylamino-4-mercapto-2-azetidinone,
3-o-nitrophenoxyacetamido-4-mercapto-2-azetidinone.
3-carbobenzyloxyamino-4-mercapto-2-azetidinone, and
3-carbo-t-butyloxyamino-4-mercapto-2-azetidinone, respectively, or directly to 3-amino-4-mercapto-2-azetidinone depending upon the reagent used.

In one preparation use is made as a blocked amino group of o-nitrophenylacetamido, which has the structure

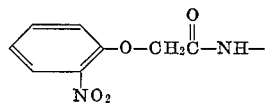

Equally useful groups which are handled in the same manner are the groups having the formulae

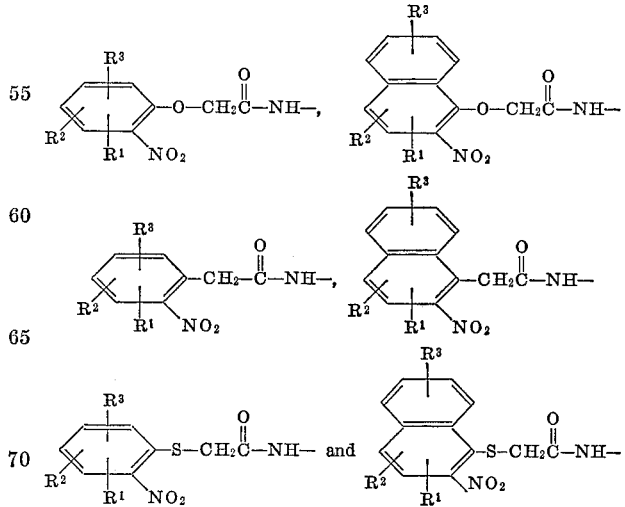

wherein $R^1$, $R^2$ and $R^3$ are each hydrogen, (lower)alkyl, (lower)alkoxy, chloro, bromo, iodo, trifluoromethyl, cyano or methylsulfonyl.

The intermediates having the formula

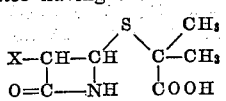

where X has the meaning set out above are also prepared by the usual methods of putting such groups in place on a primary amino group of an amino acid e.g., by use of o-nitrophenoxyacetyl chloride or trityl chloride, utilizing the intermediate of the formula

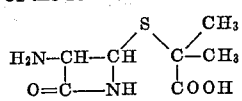

whose properties and preparation by reaction of hydrazine hydrate upon 3-phthalimido-4-(1'-carboxy-1'-methylethylthio)-2-azetidinone have been described by Karl G. Brandt, Ph. D. Thesis, Massachusetts Institute of Technology, Cambridge, Mass., August 1964.

While in the foregoing specification various embodiments of this invention have been set forth in specific detail and elaborated for the purpose of illustration, it will be apparent to those skilled in the art that this invention is susceptible to other embodiments and that many of the details can be varied widely without departing from the basic concept and the spirit and scope of the invention.

I claim:
1. The compounds of the formulae

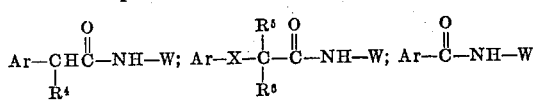

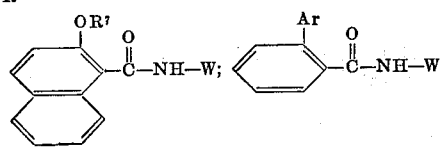

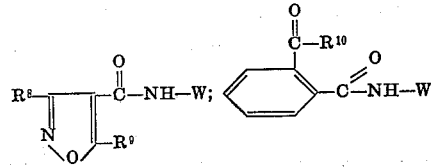

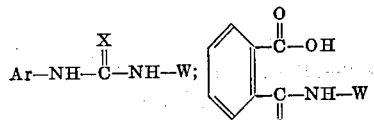

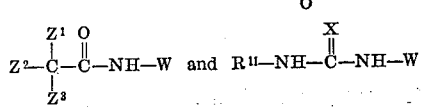

wherein $R^4$ represents a member selected from the group consisting of hydrogen, amino, carbobenzoxyamino, phenyl, fluoro, chloro, bromo, iodo, hydroxy, (lower)alkanoyloxy and (lower)alkoxy; X represents a member selected from the group consisting of oxygen and sulfur; $R^5$ and $R^6$ each represent a member selected from the group consisting of hydrogen, phenyl, benzyl, phenethyl and (lower)alkyl; $R^7$ represents (lower)alkyl; $R^8$ and $R^9$ each represent a member selected from the group consisting of (lower)alkyl, (lower)alkylthio, benzylthio, cyclohexyl, cyclopentyl, cycloheptyl, benzyl, phenethyl, phenylpropyl, furyl, thienyl, naphthyl and Ar-; $R^{10}$ represents a member selected from the group consisting of (lower)alkylamino, di(lower)alkylamino, cycloalkylamino having from 3 to 7 carbon atoms inclusive, allylamino, diallylamino, phenyl(lower)alkylamino, morpholino, lower(alkyl)morpholino, di(lower)alkylmorpholino, morpholino(lower)alkylamino, pyrrolidino, (lower)alkylpyrrolidino, di(lower)alkylpyrrolidino, N,N-hexamethyleneimino, piperidino, (lower)alkylpiperidino, di(lower)alkylpiperidino, 1,2,5,6 - tetrahydropyridino, N-(lower)alkylpiperazino, N-phenylpiperazino, N-(lower)alkyl(lower)alkylpiperazino, N-(lower)alkyl-di-(lower)alkylpiperazino, furfurylamino, tetrahydrofurfurylamino, N - (lower)alkyl-N-furfurylamino, N-alkyl-N-anilino and (lower)alkoxyanilino; $Z^1$, $Z^2$ and $Z^3$ each represent a member selected from the group consisting of (lower)alkyl and Ar-; $R^{11}$ represents a member selected from the group consisting of (lower)alkyl, (lower)cycloalkyl, naphthyl, benzyl, phenethyl and

and Ar represent a monovalent radical having one of the formulae

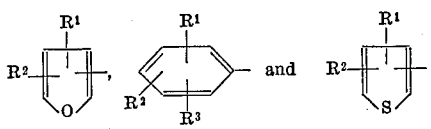

wherein $R^1$, $R^2$ and $R^3$ are each a member selected from the group consisting of hydrogen, chloro, bromo, iodo, trifluoromethyl, phenyl, (lower)alkyl and (lower)alkoxy, but only one R group may represent phenyl, and W represents one of the two groups having the formulae

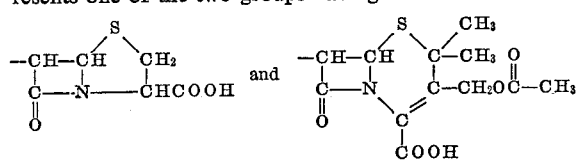

and nontoxic pharmaceutically acceptable salts thereof.

2. A compound of claim 3 having the formula

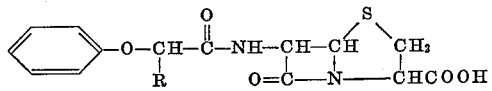

wherein R represents (lower)alkyl.

3. A compound of claim 3 having the formula

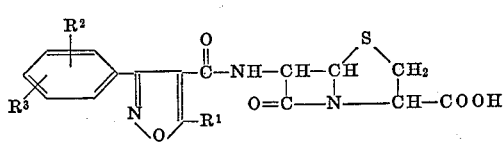

wherein $R^1$ represents (lower)alkyl and $R^2$ and $R^3$ each represent a member selected from the group consisting of hydrogen and chloro.

4. A compound of claim 3 having the formula

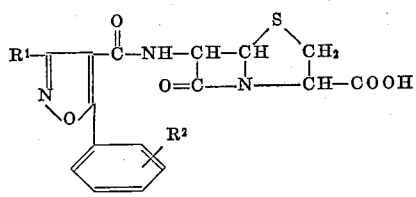

wherein $R^1$ is (lower)alkyl and $R^2$ is a member selected from the group consisting of hydrogen and chloro.

5. A compound of claim 3 having the formula

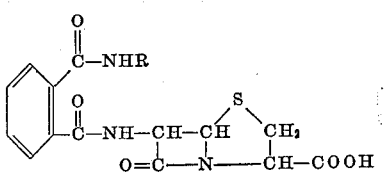

wherein R represents (lower)alkyl.

6. A compound of claim 3 having the formula

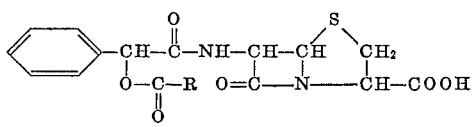

wherein R is (lower)alkyl.

7. A compound of claim 3 having the formula

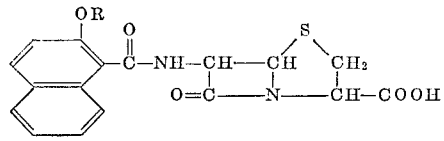

wherein R is (lower) alkyl.

8. The compound of claim 3 having the formula

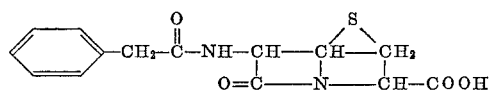

9. The compound of claim 3 having the formula

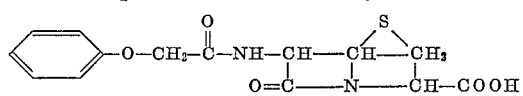

10. The compound of claim 3 having the formula

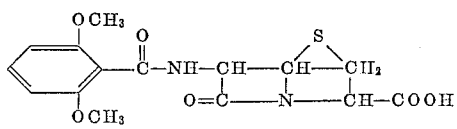

11. The compound of claim 3 having the formula

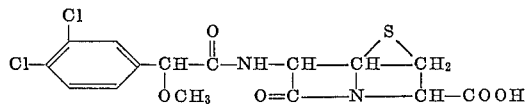

12. The compound of claim 3 having the formula

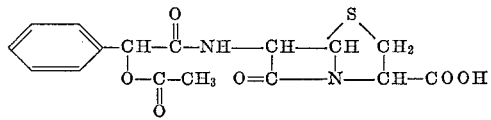

13. A compound of claim 3 having the formula

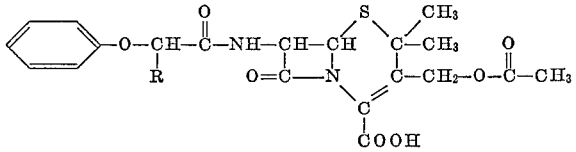

wherein R represents (lower) alkyl.

14. A compound of claim 3 having the formula

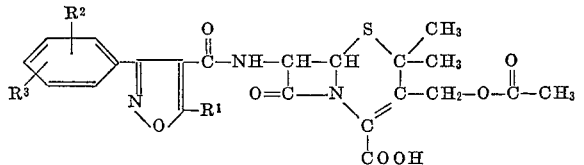

wherein $R^1$ represents (lower) alkyl and $R^2$ and $R^3$ each represent a member selected from the group consisting of hydrogen and chloro.

15. A compound of claim 3 having the formula

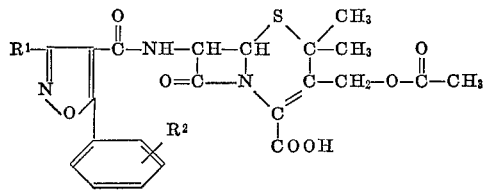

wherein $R^1$ is (lower) alkyl and $R^2$ is a member selected from the group consisting of hydrogen and chloro.

16. A compound of claim 3 having the formula

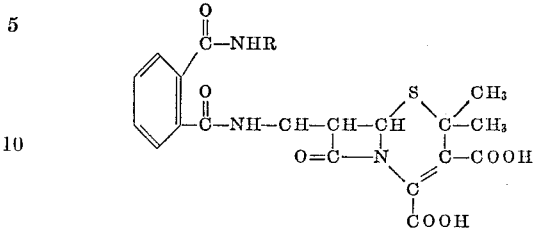

wherein R represents (lower)alkyl.

17. A compound of claim 3 having the formula

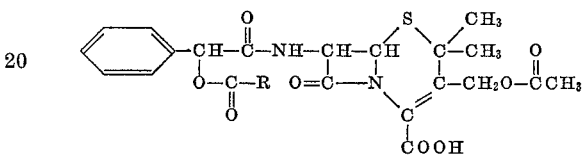

wherein R is (lower)alkyl.

18. A compound of claim 3 having the formula

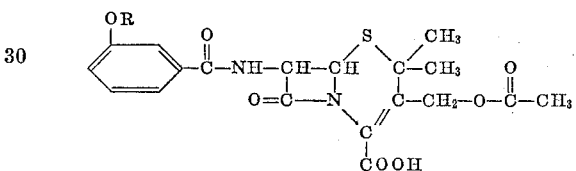

wherein R is (lower)alkyl.

19. The compound of claim 3 having the formula

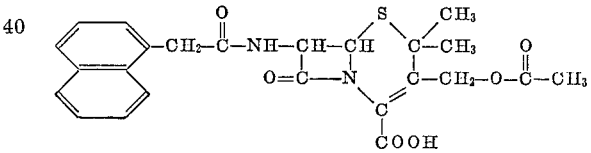

20. The compound of claim 3 having the formula

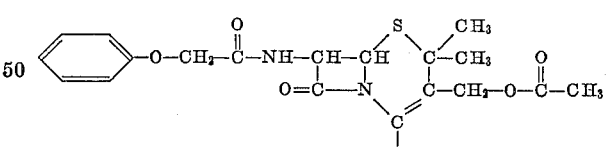

21. The compound of claim 3 having the formula

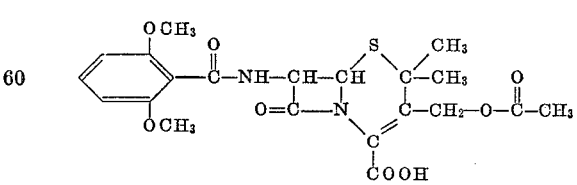

22. The compound of claim 3 having the formula

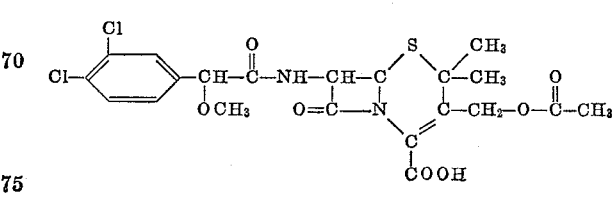

23. The compound of claim 3 having the formula
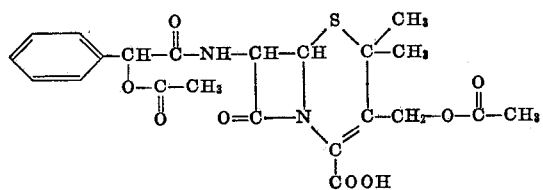
References Cited
UNITED STATES PATENTS
2,219,660  11/1965  Hoffman et al. ____ 260—239.1
3,275,626  9/1966  Morin et al.
NICHOLAS S. RIZZO, Primary Examiner
U.S. Cl. X.R.
260—243, 999